United States Patent
Memon et al.

(10) Patent No.: US 7,756,899 B2
(45) Date of Patent: *Jul. 13, 2010

(54) REASSEMBLING FRAGMENTED FILES OR DOCUMENTS IN A FRAGMENT ORDER-INDEPENDENT MANNER

(75) Inventors: Nasir Memon, Holmdel, NJ (US); Anandabrata Pal, Brooklyn, NY (US); Kulesh Shanmugasundaram, Bronx, NY (US)

(73) Assignee: Polytechnic Institute of New York University, Brooklyn, NY (US)

( * ) Notice: Subject to any disclaimer, the term of this patent is extended or adjusted under 35 U.S.C. 154(b) by 773 days.

This patent is subject to a terminal disclaimer.

(21) Appl. No.: 11/523,728

(22) Filed: Sep. 19, 2006

(65) Prior Publication Data

US 2007/0198606 A1 Aug. 23, 2007

Related U.S. Application Data

(60) Provisional application No. 60/718,370, filed on Sep. 19, 2005.

(51) Int. Cl.
G06F 7/00 (2006.01)
G06F 17/30 (2006.01)
(52) U.S. Cl. ........................ 707/796; 707/802
(58) Field of Classification Search .................. 382/220
See application file for complete search history.

(56) References Cited

U.S. PATENT DOCUMENTS

2007/0198607 A1 8/2007 Memon et al.

OTHER PUBLICATIONS

U.S. Appl. No. 11/523,730, filed Sep. 19, 2006, Memon, et al.
M. Kharrazi, K. Shanmugasundaram and N. Memon, "Network Abuse Detection via Flow Content Characterization," *IEEE Information Assurance Workshop*, Westpoint, NY, Jun. 2004.
M. Kharrazi, K. Shanmugasundaram and N. Memon, "Nabs: A System for Detecting Resource Abuses via Characterization of Flow Content Type," *ACSAC—Annual Computer Security Applications Conference*, Tucson, Arizona, Nov. 2004.

*Primary Examiner*—Cam Y T Truong
(74) *Attorney, Agent, or Firm*—Straub & Polotylo; John C. Pokotylo

(57) ABSTRACT

Files can be reassembled from fragments by (a) accepting adjacency scores for each pair of fragments from a set of fragments, (b) identifying header fragments from the set of fragments, and (c) for each of the header fragments, (i) setting a current fragment to the identified header fragment, (ii) selecting, from any of the fragments not identified as a header fragment, a fragment with a best adjacency score with the current fragment, (iii) determining if the selected fragment has a better adjacency score with any of the other fragments not identified as a header than with the current fragment, (iv) if so, then (A) selecting another fragment, from any of the fragments not identified as a header fragment, a fragment with a next best adjacency score with the current fragment, and continuing, and otherwise (A) adding the selected fragment to a reassembly path started with the identified header fragment, and (B) setting the current fragment to the selected fragment, and continuing until the file is reconstructed.

12 Claims, 9 Drawing Sheets

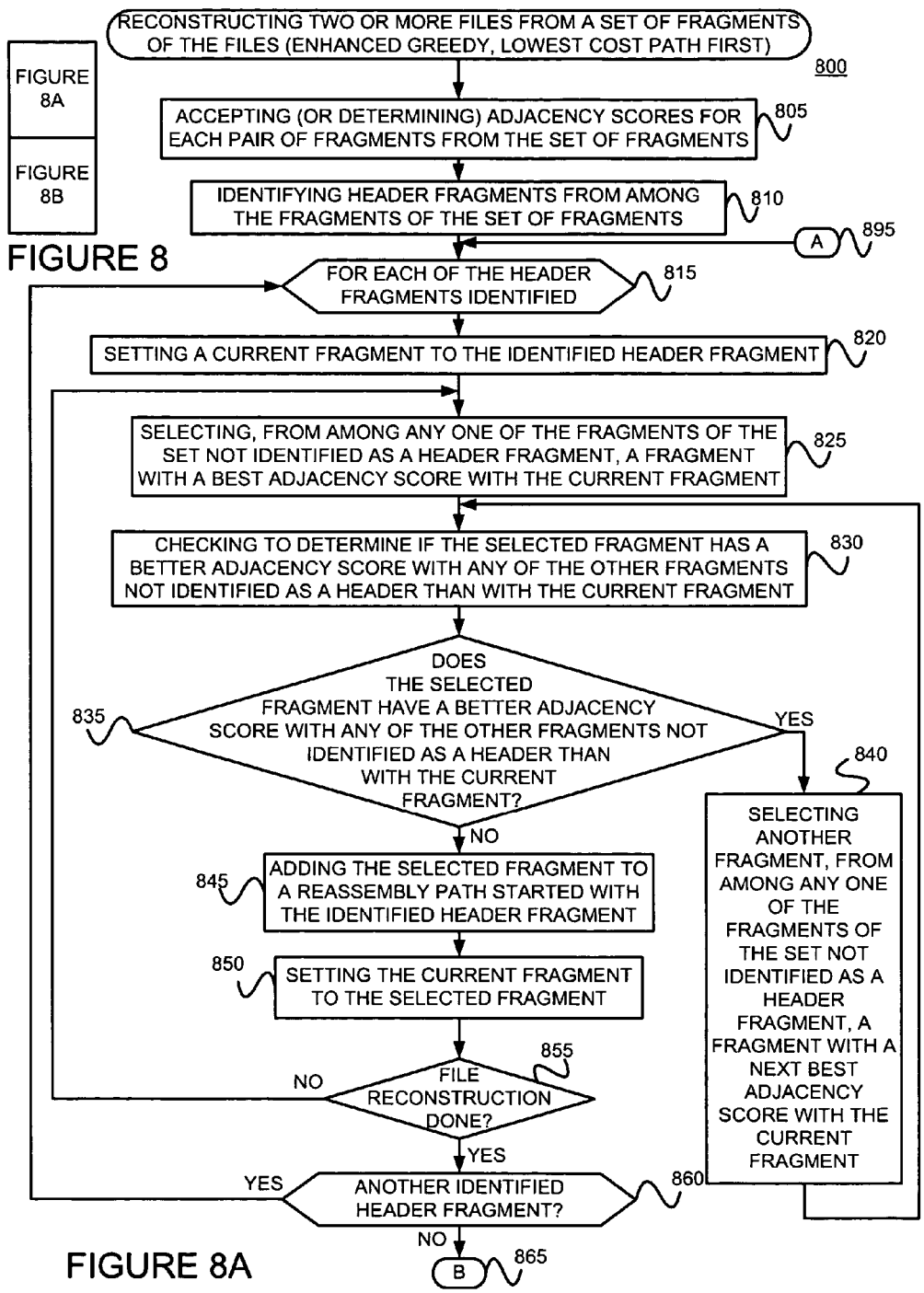

REASSEMBLING FRAGMENTED FILES OR DOCUMENTS IN A FRAGMENT ORDER-INDEPENDENT MANNER

§0. RELATED APPLICATIONS

Benefit is claimed, under 35 U.S.C. §119(e)(1), to the filing date of U.S. provisional patent application Ser. No. 60/718,370 (referred to as "the '370 provisional"), titled "APPARATUS AND METHOD FOR REASSEMBLING FRAGMENTED FILES OR DOCUMENTS", filed on Sep. 19, 2005, and listing Kulesh SHANMUGASUNDARAM, Anandabrata PAL and Nasir MEMON as the inventors, for any inventions disclosed in the manner provided by 35 U.S.C. §112, ¶1. The '370 provisional application is expressly incorporated herein by reference. The scope of the present invention is not limited to any requirements of the specific embodiments described in the '370 provisional application.

§1. BACKGROUND OF THE INVENTION

§1.1 Field of the Invention

The present invention concerns file recovery. In particular, the present invention concerns facilitating the recovery of fragmented files.

§1.2 Background Information

File fragmentation is often an unintended consequence of deletion, modification and creation of files in a storage device. Fragmentation could also be result of a deliberate act by someone to conceal critical electronic evidence. Therefore, a forensic analyst investigating storage devices may come across many scattered fragments without any easy means of being able to reconstruct the original files. In addition, the analyst may not easily be able to determine if a fragment belongs to a specific file or if the contents of the fragment are part of the contents from a particular type of file such as image, video, or plain-text etc.

Digital evidence by nature is easily scattered and a forensic analyst may come across scattered evidence in a variety of situations. This is especially true with the FAT16 and FAT32 file systems, which due to the popularity of the Windows operating system from Microsoft, are perhaps still the most widely used file systems on personal computers. Furthermore, due to the ubiquitous presence of Windows and easier implementation considerations, the FAT file systems has been adopted in many consumer storage media devices, such as compact flash cards used in digital cameras and USB mini-storage devices. The FAT file system however is not very efficient in maintaining continuity of data blocks on the disk. Due to fragmentation, when a file is stored data blocks could be scattered across the disk. Without adequate file table information, it is difficult to put the fragments back together in their original order.

Often critical file table information is lost because they are overwritten with new entries. In fact, the most widely used disk forensics tools like TCT (See, e.g., The Coroner's Toolkit (TCT) at porcupine.org/forensics/tct.html.), dd utility, The Sleuth Kit (See, e.g., The Sleuth Kit at sleuthkit.org/.), and Encase (See, e.g., Guidance Software Inc., Encase at encase.com/.) can recover data blocks from deleted files automatically. However, when the data blocks are not contiguous these tools cannot reassemble the blocks in the correct order to reproduce the original file without proper file table entries. The job of reassembling these fragments is usually a tedious manual job carried out by a forensic analyst.

Another situation, where a forensic analyst comes across scattered evidence, is the swap file. The system swap file is one of the critical areas where lot of useful forensic information can be gathered. The swap file contains critical information about the latest events that occurred on a computer. Therefore, reconstructing contents of the swap file is vital from a forensic standpoint. In order to achieve better performance, operating systems maintain swap file state and addressing information in page-tables stored only in volatile memory. When computers are secured for evidential purposes, they are simply unplugged and sent to a forensic lab. Unfortunately contents of volatile memory are usually lost beyond recovery during evidence collection. Without the addressing information from the page-table, it is difficult to rebuild contents off of a swap file. Again, a forensic analyst is left with a collection of randomly scattered pages of memory.

One of the most popular and naive approach to hiding evidence is to store them in slack space in the file system. Files are assigned certain number of disk blocks for storage. However, not all files fit exactly into the allocated blocks. In most cases files end up using only a portion of their last block. The unused space in this last block is known as slack space. Modifying the contents of slack space does not affect the integrity of data stored in the file system because the read operation does not read data in slack space. A criminal can modify a file hiding program to choose the blocks on which files are hidden based on a sequence of numbers generated using a password. Knowing the password he can reconstruct the original document, whereas a forensic analyst is left with randomly mixed fragments of a document which will need to be reassembled.

Finally, ubiquitous networking and growing adoption of peer-to-peer systems give anyone easy access to computers around the world. There are many peer-to-peer systems which enable users to store data on a network of computers for easy, reliable access anytime, anywhere. Freenet (See, e.g., Freenet at freenetproject.org/), Gnutella (See, e.g., Gnutella at gnutella.wego.com/.) and M-o-o-t (See, e.g., M o-o t at m-o-o-t.org/.) are some of the better known systems used by millions of users around the world and many others, such as Ocean-Store (See, e.g., J. Kubiatowicz and D. Bindel, "Oceanstore: An architecture for global-scale persistent storage," *Proceedings of the Ninth International Conference on Architectural Support for Programming Languages and Operating Systems* (2000).), Chord (See, e.g., I. Stoica and R. Morris, "Chord: A scalable peer-to-peer lookup service for internet applications," *ACM SIGCOMM* 2001, pp. 149-160 (2001).) and Pastry (See, e.g., A. Rowstron and P. Druschel, "Pastry: Scalable, distributed object location and routing for large-scale peer-to-peer systems," *IFIP/ACM International Conference on Distributed Systems Platforms*, pp. 329-350 (2001).), are in development at research laboratories. These systems are designed to provide reliable, distributed, and sometimes anonymous storage networks. A criminal can use these very systems to hide software tools and documents that might be useful for his prosecution, just as easily as any other user can save a file. Most peer-to-peer systems associate a unique key, either assigned by the user or generated automatically, with each document they store. Hence, a person can split a document into fragments and store each fragment in a peer-to-peer system using a sequence of secret phrases as keys, such that he can easily splice the fragments together knowing the proper sequence of secret phrases. For instance, in Freenet one can assign each fragment a unique URL. Since URLs are user friendly keywords it is easy to recall the proper sequence to retrieve and splice the fragments together. It is, however, difficult to reconstruct the original document without the knowledge of the proper sequence even if the keywords are known.

As can be appreciated from the foregoing, digital evidence can easily take a variety of forms and be scattered into hundreds of fragments making reassembly a daunting task for a human analyst.

The problem of reassembly of file fragments differs, in many ways, from the reassembly of fragments of physical objects, like shards of pottery or jigsaw puzzles. First, file fragments do not have a set shape as they are simply consecutive bytes of a file stored in a disk. Therefore, known shape matching techniques are not very useful for reconstructing fragmented files. For example, FIGS. 2A-2C show three (3) potential reassembly sequences of an image consisting of five (5) eight-unit fragments. Each fragment is the same size in this example. As shown, the shape of the fragment depends on where it is used for reconstruction. Further, a fragment in the reassembly of physical object fragments and jigsaw puzzles may potentially link to multiple fragments, while file fragments will typically be linked to at most two other fragments (one above and one below, or one before and one after). Furthermore, since fragments of physical objects will often have large edges, edge information can be used for reassembly. File fragments, on the other hand, will often have relatively small edges. Consequently, the edges provide less information for reassembly.

The present inventors have presented techniques for reassembling fragmented documents, such as images. (See, e.g., K. Shanmugasundaram and N. Memon, "Automatic Reassembly of Document Fragments via Data Compression," *2nd Digital Forensics Research Workshop*, Syracuse (July 2002); A. Pal, K. Shanmugasundaram and N. Memon, "Automated Reassembly of Fragmented Images," *ICASSP*, (2003); and K. Shanmugasundaram and N Memon, "Automatic Reassembly of Document Fragments via Context Based Statistical Models," *Annual Computer Security Applications Conference*, (2003). Each of these papers is incorporated herein by reference.) In particular, the present inventors have described a greedy heuristic that, starting with the header fragment, reconstructs each file one fragment at a time. More specifically, the header fragment is stored as the first fragment in a reconstruction path P of the file and is then set as the current fragment "s". After selecting a fragment s, the fragment's best successor match "t" is chosen. The best match is based on the best candidate weight as determined by a weight calculation technique or any other metric. The fragment t is then added to the reconstruction path P and becomes the latest current fragment. This process is repeated until the file is reconstructed. The pseudo code for the greedy heuristic is:

```
Greedy (currentFragment , availableFragment s [ ]){
    for (x=1; x < availableFragment s . size; ++x){
        bestMatch= get best < x > fragment f o r currentFragment
        if (bestMatch found in availableFragment s [ ])
            return bestMatch ;
    }
}
```

In particular, the inventors have described a technique called Greedy Unique Path ("UP"), which is a sequential algorithm using the greedy heuristic. During reassembly using Greedy UP, if a fragment is assigned to a file reconstruction, it will be unavailable for use in the reconstruction of any other files. Let $P_i$ be the reconstruction path of file i and the header fragment for i be identified as $h_i$. To start, the header hi is chosen as the first fragment in the reconstruction path (i.e. assign Pi=hi). The current fragment is set equal to the header s=hi, and then the best available greedy match t for the current fragment s is found. The best available match is the best match t for s that has not been used in any another file reassembly. The fragment t is placed in the reconstruction path ($P_i=P_i\|t$) and is then set as the current fragment for processing (s=t). The best match for the new current fragment is found, and the process is repeated until the file is reconstructed. Subsequent files are then reconstructed in the same manner until all k files have been reassembled.

Although the greedy UP fragmented file reconstruction technique creates vertex disjoint paths, the paths might depend on the order of files being processed. That is, changing the order in which the files are processed may result in different reassembly results. For example, referring to FIG. 6 of the '370 provisional, with Greedy UP, both the image of the dog and plane will reconstruct perfectly if the dog is reconstructed first and then the plane 6(b). If, however, the plane is reconstructed first it will reconstruct incorrectly thus causing the dog to reconstruct incorrectly 6(c). This is because some of the fragments of the dog will be assigned to the plane, and then the dog will reconstruct incorrectly because those fragments of the dog assigned to the plane will not be available.

As can be appreciated from the foregoing, it would be useful to facilitate the reconstruction of fragmented files, either in a totally automated fashion, or in a semi-automated fashion using user feedback. It would be useful if such techniques would improve upon the greedy UP technique.

§2. SUMMARY OF THE INVENTION

Embodiments consistent with the present invention can be used to reassemble files from fragments. For example, at least some embodiments consistent with the present invention might do so by (a) accepting adjacency scores for each pair of fragments from the set of fragments, (b) identifying header fragments from among the fragments of the set of fragments, and (c) for each of the header fragments identified, (i) setting a current fragment to the identified header fragment, (ii) selecting, from among any one of the fragments of the set not identified as a header fragment, a fragment with a best adjacency score with the current fragment, (iii) checking to determine if the selected fragment has a better adjacency score with any of the other fragments not identified as a header than with the current fragment, (iv) if it is determined that the selected fragment has a better adjacency score with any of the other fragments not identified as a header than with the current fragment, then (A) selecting another fragment, from among any one of the fragments of the set not identified as a header fragment, a fragment with a next best adjacency score with the current fragment, and (B) repeating (iii) and (iv), and if it is determined that the selected fragment does not have a better adjacency score with any of the other fragments not identified as a header than with the current fragment, then (A) adding the selected fragment to a reassembly path started with the identified header fragment, and (B) setting the current fragment to the selected fragment, and (v) repeating (ii)-(iv) until the file is reconstructed.

At least some embodiments consistent with the present invention might use a greedy technique for reconstructing files. Other embodiments consistent with the present invention might use an enhanced greedy technique for reconstructing files.

§3. BRIEF DESCRIPTION OF THE DRAWINGS

Figure 8B:
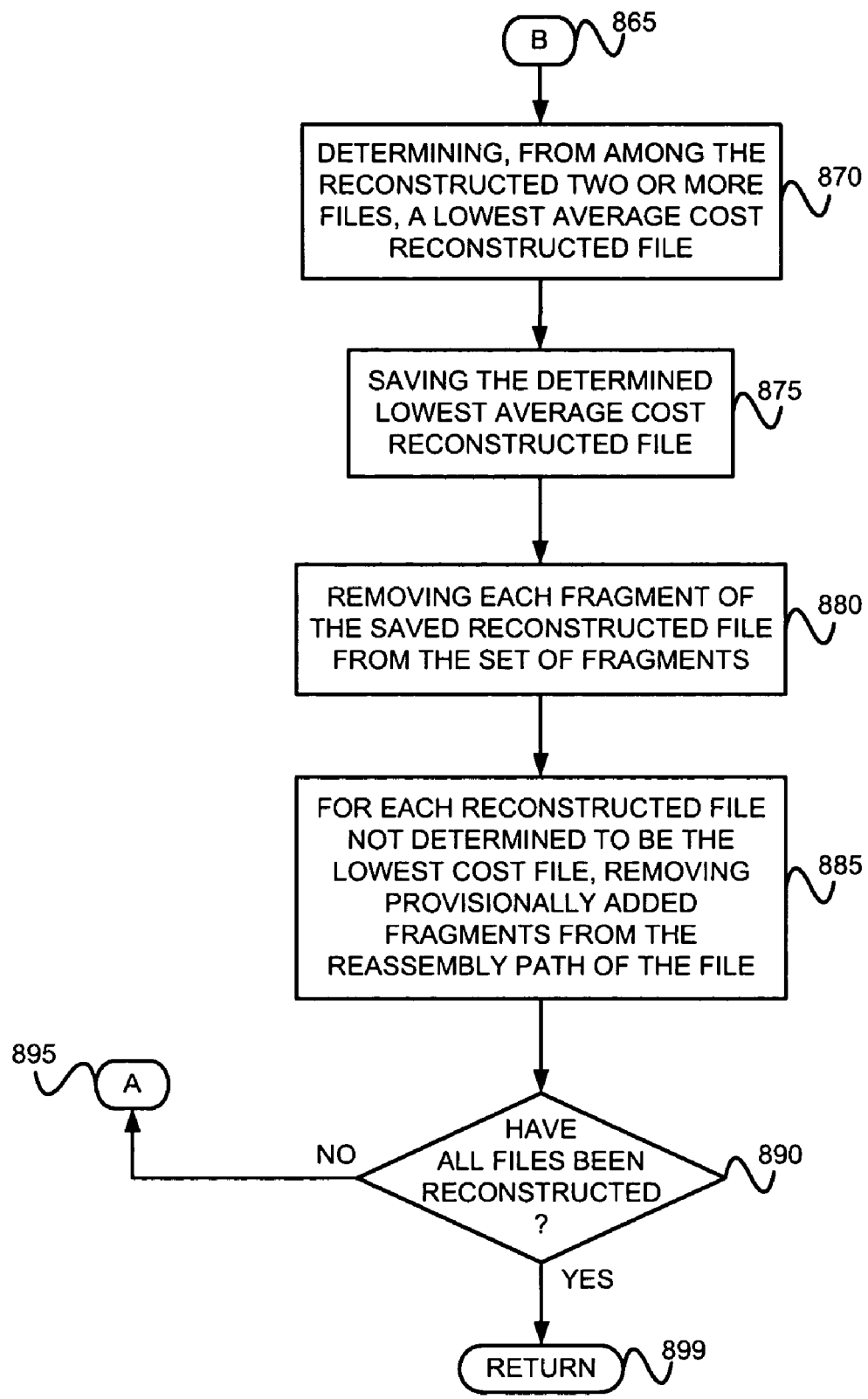

FIG. 8, which includes FIGS. 8A and 8B, is a flow diagram of an exemplary method for reconstructing two or more files from a set of fragments of the files using an enhanced greedy, lowest cost path first, technique in a manner consistent with the present invention.

Figure 9:
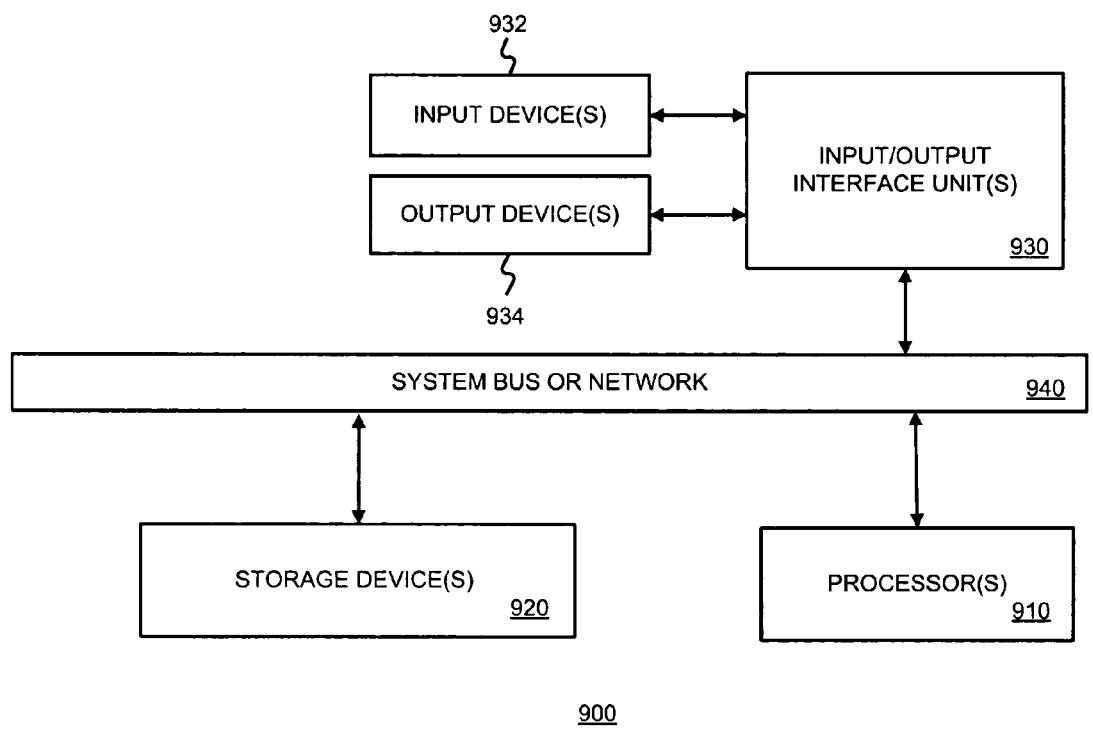

FIG. 9 is a block diagram of apparatus that may be used to perform at least some operations, and store at least some information, in a manner consistent with the present invention.

§4. DETAILED DESCRIPTION

The present invention may involve novel methods, apparatus, message formats, and/or data structures for reassembling fragmented files. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. Also, as used herein, the article "a" is intended to include one or more items. Where only one item is intended, the term "one" or similar language is used. In the following, "information" may refer to the actual information, or a pointer to, identifier of, or location of such information. No element, act or instruction used in the description should be construed as critical or essential to the present invention unless explicitly described as such. Thus, the present invention is not intended to be limited to the embodiments shown and the inventors regard their invention to include any patentable subject matter described.

§4.1 Exemplary Apparatus

Figure 1:
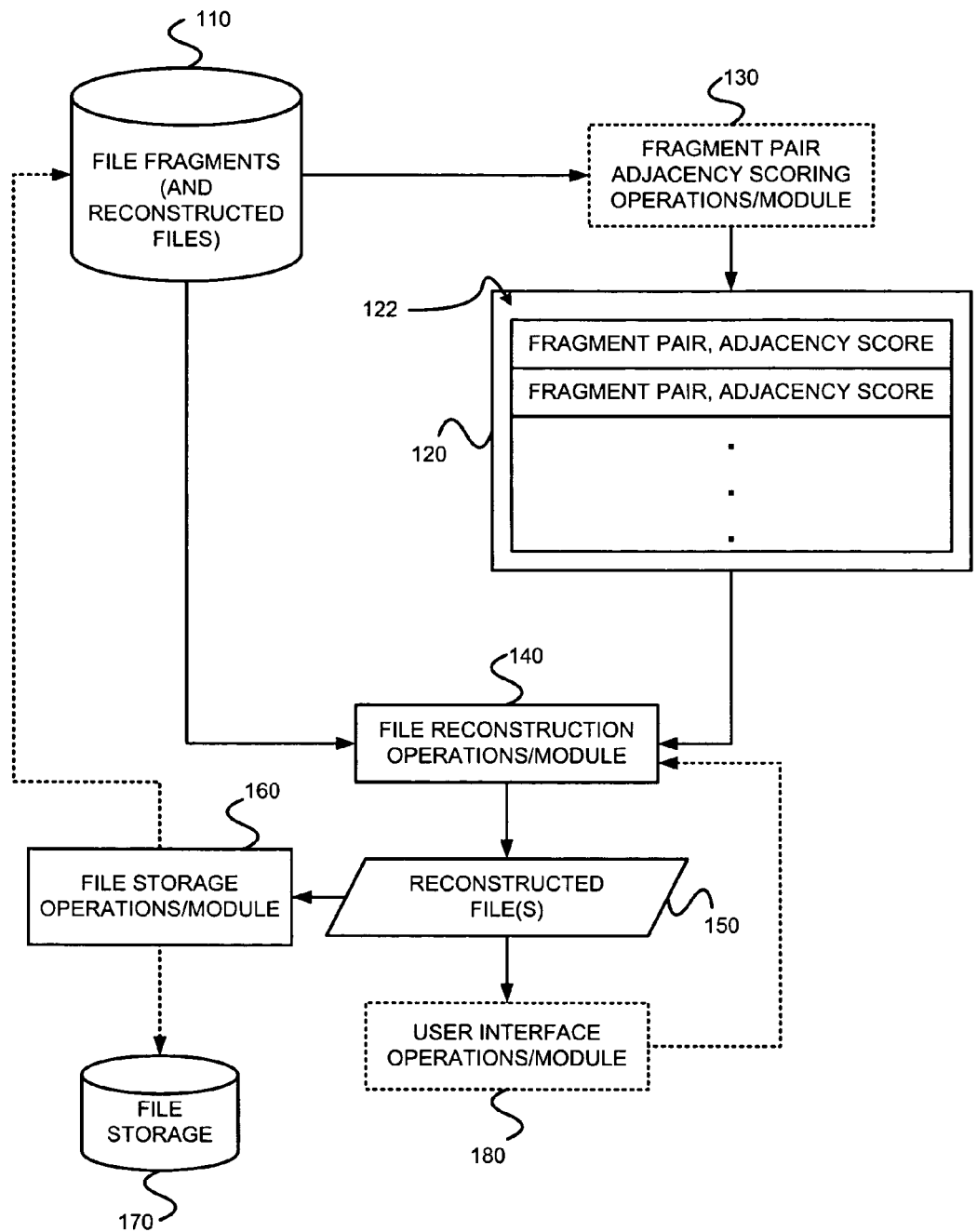
FIG. 1 is a block diagram of an exemplary embodiment consistent with the present invention.
Figure 2A:
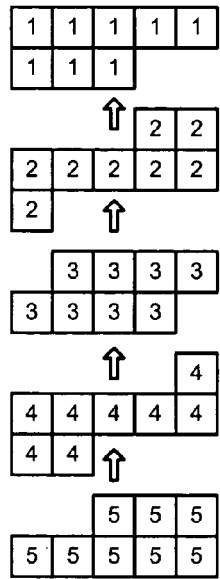
FIGS. 2A-2C illustrate different ways fragments can be reassembled into different files.
Figure 2B:
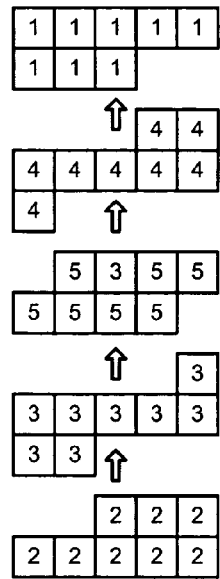
Figure 2C:
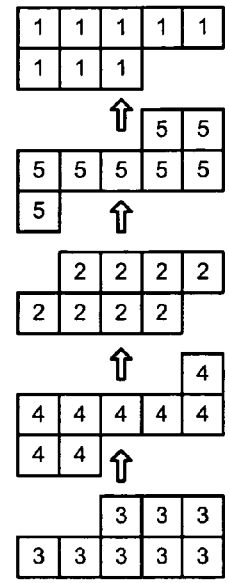

FIG. 1 is a block diagram of an exemplary embodiment 100 consistent with the present invention. Storage component 110 includes file fragments of files to be reconstructed. Fragment pair adjacency scoring operations/module 130 might be used to determine adjacency scores 120 for various pairs of the fragments stored by the storage component 110. Alternatively, these adjacency scores 120 might be provided as an input. That is, embodiments consistent with the present invention might simply accept fragment pair adjacency scores, or might determine them. Still referring to operations/module 130, various techniques (even user suggestions) might be used to determine adjacency scores. The file reconstruction operations/module 140 simply use the resulting adjacency scores to find an optimal solution. Naturally, however, the results produced by the reassembly method will depend on the accuracy of the adjacency scores.

Note that for two given fragments, an adjacency score will often be order dependent. That is, the adjacency score for fragment A followed by fragment B will often be different from the adjacency score for fragment B followed by fragment A.

Using both the fragments 110 and the fragment pair adjacency scores 120, file reconstruction operations/module might be used to reconstruct files 150 from the fragments. File storage operations/module 160 might be used to store the reconstructed files 150. For example, the reconstructed files 150 might be stored in file storage component 170, and/or back on the storage component 110. The reconstructed files might be subject to user approval. For example, user interface operations/module 180 might be used to approve of, or disapprove of, a reconstructed file (or even a portion of a reconstructed file). If a reconstructed file 150 is not approved, the fragments of the file might be reprocessed. If, on the other hand, a reconstructed file 150 is approved, it might be stored by the file storage operations/module 160.

As discussed in the '370 provisional, one embodiment consistent with the present invention might (1) gather blocks from the file system and/or from another user-specified medium and (2) attempt a serial processing of the files in the system. The results of the serial processing might then be presented to the user to obtain feedback. At this point user can merge properly reassembled fragments together. Reassembled fragments approved in this may might be excluded from subsequent processing. Further, partial reconstructions of merged files might be treated as a single fragment in subsequent reconstruction processing. Once the user feedback for serial reassembly is obtained the files might be automatically reassembled by (1) computing adjacent probabilities between all pairs of fragments, and (2) using a reassembly method (examples of which are described in §4.2 below) to determine the proper order in which chosen fragments should be put together to form the original file(s).

§4.2 Exemplary Methods

The problem of reassembling scattered fragments is now described mathematically. In some examples described here, it is assumed that fragments are recovered without loss of data (i.e., no fragments are missing or corrupted). This assumption is used only to make the explanations simpler and the exemplary embodiments described do not rely on these assumptions. Suppose there is a set $\{A_0; A_1 \ldots; A_n\}$ of fragments of a file A. It would be useful to compute a permutation $\pi$ such that $A=A\pi(0)\|A\pi(1)\| \ldots \|A\pi(n)$, where $\|$ denotes the concatenation operator. In other words, it would be useful to determine the order in which fragments $A_i$ need to be concatenated to yield the original file A. Since it is assumed that fragments are recovered without loss of data (no fragments are missing or corrupted), it is therefore assumed that concatenation of fragments in the proper order yields the original file intact.

Note that in order to determine the correct fragment reordering, fragment pairs that are adjacent in the original file need to be identified. To quantify the likelihood of adjacency, candidate adjacency scores C(i,j), representing the likelihood that fragment $A_j$ follows $A_i$, might be determined or accepted. Once these adjacency scores are assigned, the permutation of the fragments that leads to correct reassembly, among all possible permutations, is likely to optimize (e.g., maximize or minimize) the sum of candidate adjacency scores (e.g., weights) of adjacent fragments. This observation gives us a technique to identify the correct reassembly with high probability. That is, the permutation $\pi$ should be computed such that the value $$T = \sum_{i=0}^{n-1} C(\pi(i), \pi(i+1))$$

is optimized (e.g., maximized if a greater weight implies a better match, or minimized if a lower weight implies a better match) over all possible permutations $\pi$ of degree n.

Although methods for reconstructing a single fragmented file might be useful, there are many situations where such methods will be insufficient. This is because it will often be the case that multiple files, each with multiple fragments, will have to be reassembled. The complexity of the problem increases because unlike the single file case, it is not know with certainty whether a particular fragment was part of a particular file. In addition, the number of fragments to reconstruct each file may vary.

Figure 3:
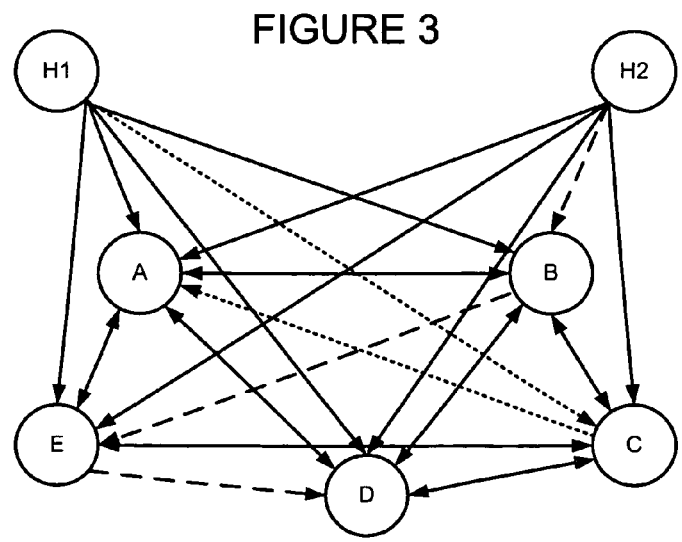
FIG. 3 illustrates a graph representation of fragments (nodes) reassembled into files represented as unique paths.

Referring to FIG. 3 (which is a graph of seven (7) fragments in which H1 and H2 are header fragments, and which includes vertex disjoint paths H1CA and H2BED), when analyzing k files fragmented into n total fragments, the fragments can be represented as a complete graph of n vertices, where each edge has a cost/weight equivalent to the candidate adjacency scores between the equivalent fragments. Assuming $P_i$ is the path or sequence of fragments reassembled for the $i^{th}$ file, then the correct solutions $(P_1, P_2, \ldots, P_k)$ are k vertex disjoint paths in this graph. The problem of finding the optimal paths is equivalent to finding k vertex disjoint paths in a complete graph such that the sum of all the paths is maximized (or minimized). Unfortunately, the optimum solution to the problem is reportedly NP-Complete (See, e.g., J. Vygen, "Disjoint paths," *Technical Report* 94816, *Research Institute for Discrete Mathematics*, (University of Bonn, 1994.), and therefore cannot be solved in linear or polynomial time.

Some embodiments consistent with the present invention might simplify the foregoing problem by identifying the starting fragments of each file. This information might be determined, for example, by (1) analyzing each fragment and (2) trying to determine if the fragment has a specific file header. More specifically, most file types have specific header formats used to identify the type as well as file specific information. For example, every Windows BMP image begins with a 54-byte image header. All BMPs are required to start with the characters 'BM'. By identifying all the fragments that are image headers, the type of image, the number of images to reconstruct and the starting fragment for each image can all be determined.

In view of the foregoing, the fragment reassembly problem may be thought of as a k-vertex disjoint path problem. If the file header fragments are identified, the number of files and/or roughly the number of fragments required to reconstruct each file may be known.

FIGS. 4-8 illustrate exemplary fragment reassembly methods. Each of these methods is described below.

§4.2.1 Greedy Non-Unique Path Reconstruction of Files

Figure 4:
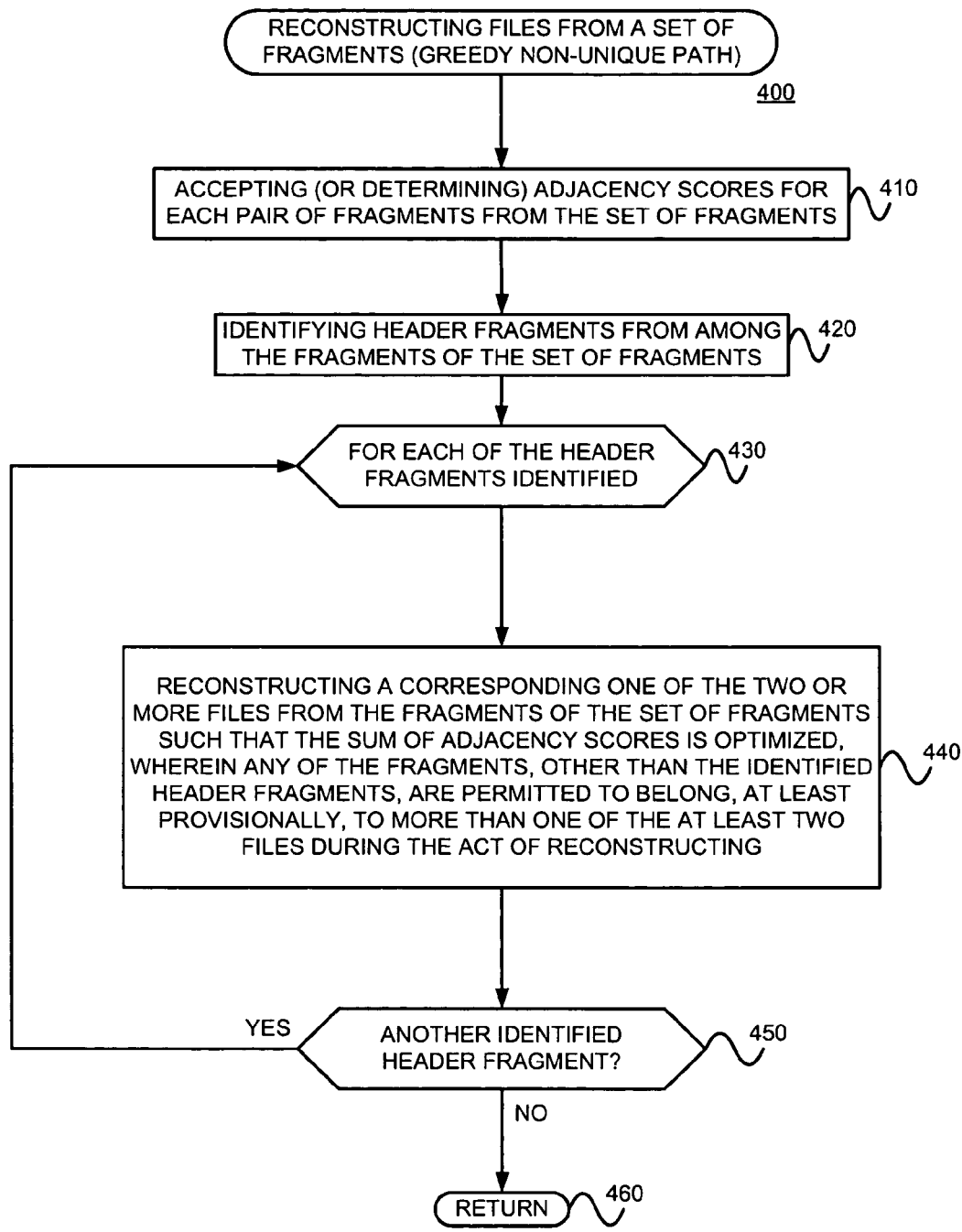
FIG. 4 is a flow diagram of an exemplary method for reconstructing two or more files from a set of fragments of the files using a greedy, non-unique path approach in a manner consistent with the present invention.

FIG. 4 is a flow diagram of an exemplary method 400 for reconstructing two or more files from a set of fragments of the files using a greedy, non-unique path approach in a manner consistent with the present invention. As shown, adjacency scores for each pair of fragments from the set of fragments is accepted or determined. (Block 410) Header fragments are identified from among the fragments of the set of fragments. (Block 420) As indicated by loop 430-450, block 440 is performed for each of the header fragments identified. In particular, one of the two or more files corresponding to the current header fragment is reconstructed from the fragments of the set of fragments such that the sum of the adjacency scores is optimized, wherein any of the fragments, other than the identified header fragments, are permitted to belong, at least provisionally, to more than one of the at least two files during the act of reconstructing. (Block 440) Once all of the identified header fragments have been processed, the method 400 is left. (Node 460)

Referring back to block 440, the act of reconstructing a corresponding one of the two or more files might include, for each of the identified header fragments, (1) setting a current fragment to the identified header fragment, (2) selecting, from among any one of the fragments of the set not identified as a header fragment, a fragment with a best adjacency score with the current fragment, (3) adding the selected fragment to a reassembly path started with the identified header fragment, (4) setting the current fragment to the selected fragment, and (5) repeating acts (2)-(4) until the file is reconstructed.

In some exemplary implementations of the method 400, each of the identified header fragments are processed in sequence. For example, the sequence might be determined randomly.

The method 400 can use the greedy heuristic described in §1.2 above. Since any fragment, other than a header fragment, which was chosen in the reconstruction of a file, will nonetheless be available for selection in the reassembly of another file, this method 400 might be thought of as a non-unique path method. This advantageously prevents errors from propagating. Unlike the greedy unique path method introduced in §1.2 above, processing the files in different sequences will not lead to different reassembly results. Therefore, the file header fragments can be processed in any order (e.g., even randomly). The header $h_i$ chosen is used as the first fragment in the reconstruction path (i.e., assign $P_i=h_i$). A current fragment is set equal to the header, $s=h_i$, and the best greedy match t for s is found. Even if the best match was used in another file path, it can nonetheless be selected and put it in the reconstruction path ($P_i=P_i\|t$) and it can then be set it as the current fragment for processing (s=t). The process is repeated until the file is reconstructed. The next file is (or files are) similarly processed until all k files have been reassembled.

Referring to FIG. 6(a) of the '370 provisional, since this method can choose fragments that were chosen in an earlier image, mistakes like that of the dog not reconstructing even though the plane was reconstructed incorrectly (by using some of the fragments from the dog) do not occur. It can be seen clearly that some of the fragments from the dog are used in both reconstructions.

Referring back to block 440, the act of reconstructing a corresponding one of the two or more files might use an enhanced greedy methodology (described below) instead.

§4.2.2 Parallel Unique Path Reconstruction of Files

Figure 5:
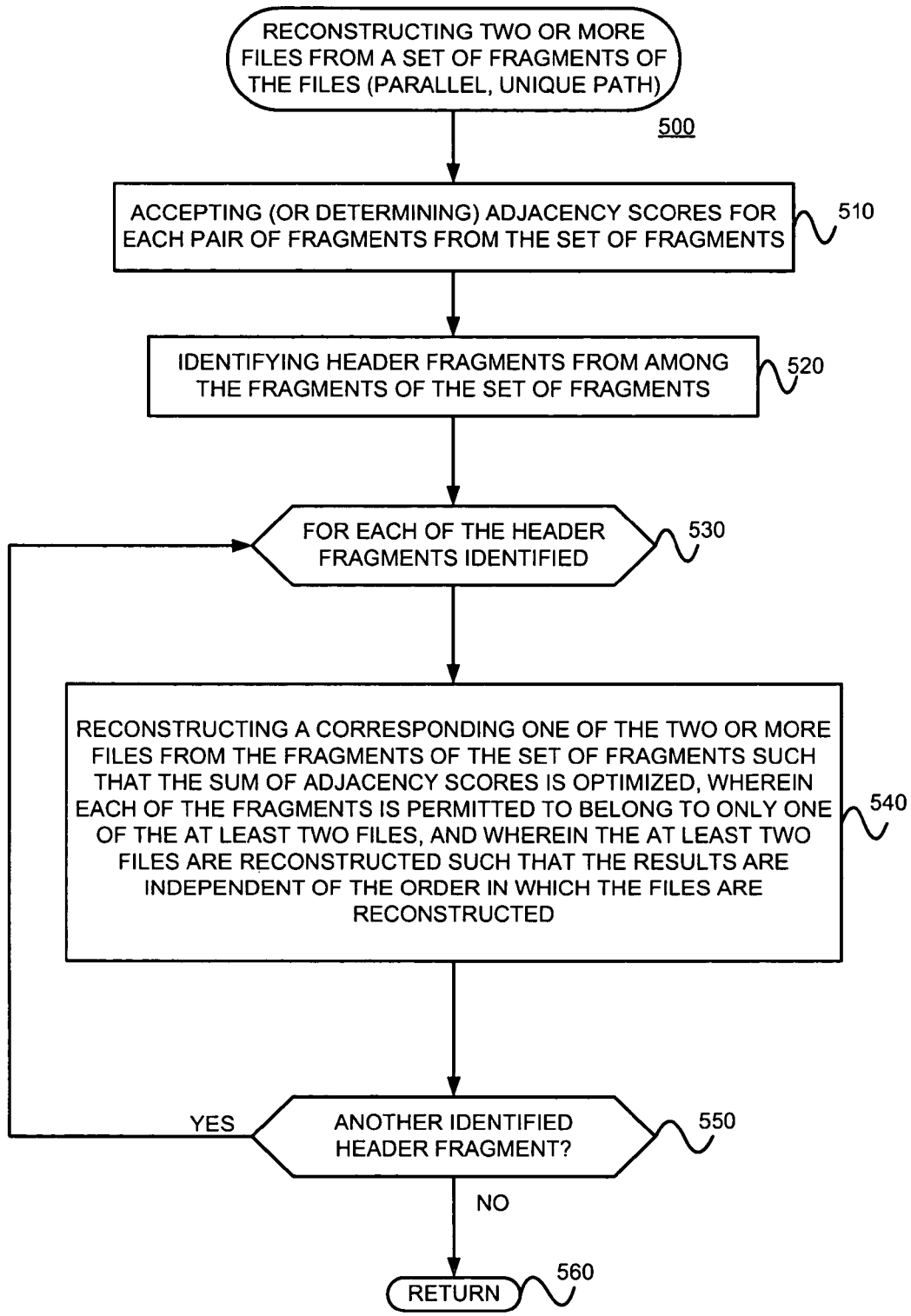
FIG. 5 is a flow diagram of an exemplary method for reconstructing two or more files from a set of fragments of the files using a parallel, unique path approach in a manner consistent with the present invention.

FIG. 5 is a flow diagram of an exemplary method 500 for reconstructing two or more files from a set of fragments of the files using a parallel, unique path approach in a manner consistent with the present invention. As shown, adjacency scores for each pair of fragments from the set of fragments is accepted or determined. (Block 510) Header fragments are identified from among the fragments of the set of fragments. (Block 520) As indicated by loop 530-550, block 540 is performed for each of the header fragments identified. In particular, one of the two or more files corresponding to the current header fragment is reconstructed from the fragments of the set of fragments such that the adjacency scores are optimized, wherein each of the fragments is permitted to belong to only one of the at least two files, and wherein the at least two files are reconstructed such that the results are independent of the order in which the files are reconstructed. (Block 540) Once all of the identified header fragments have been processed, the method 500 is left. (Node 560)

Referring back to block 540, the act of reconstructing a corresponding one of the two or more files might include, for each of the identified header fragments, (1) setting a current fragment of the file started with the identified header fragment to the identified header fragment, and (2) selecting, from among any one of the fragments of the set not identified as a header fragment, a fragment with a best adjacency score with the current fragment of the file started with the identified header fragment. Then, it might determined, from among all of the files started with the identified header fragments, the current fragment-best adjacency score fragment pair with the highest adjacency score. The best adjacency score fragment of the current fragment-best adjacency score fragment pair determined to have the highest adjacency score might then be added to a reassembly path started with the associated identified header fragment. Further, the current fragment for the file started with the identified header fragment might be set to the added best adjacency fragment. These acts might be repeated until the files are reconstructed.

Referring back to block 540, the act of reconstructing a corresponding one of the two or more files might use an enhanced greedy methodology (described below) instead. For example, the block 540 might, for each of the identified header fragments, (1) set a current fragment of the file started with the identified header fragment to the identified header fragment, (2) select, from among any one of the fragments of the set not identified as a header fragment, a fragment with a best adjacency score with the current fragment of the file started with the identified header fragment, (3) and check to determine if the selected fragment of the file started with the identified header fragment has a better adjacency score with any of the other fragments not identified as a header than with the current fragment, of the file started with the identified header fragment. If it is determined that the selected fragment of the file started with the identified header fragment has a better adjacency score with any of the other fragments not identified as a header than with the current fragment of the file started with the identified header fragment, then, from among any one of the fragments of the set not identified as a header fragment, a fragment with a next best adjacency score with the current fragment of the file started with the identified header fragment might be selected. The check might be repeated.

The current fragment-best adjacency score fragment pair with the highest adjacency score, from among all of the files started with the identified header fragments, might the be determined. The best adjacency score fragment of the current fragment-best adjacency score fragment pair determined to have the highest adjacency score might then be added to a reassembly path started with the associated identified header fragment. The current fragment for the file started with the identified header fragment may then be set to the added best adjacency fragment.

This process may then be repeated until the files are reconstructed.

Figure 7:
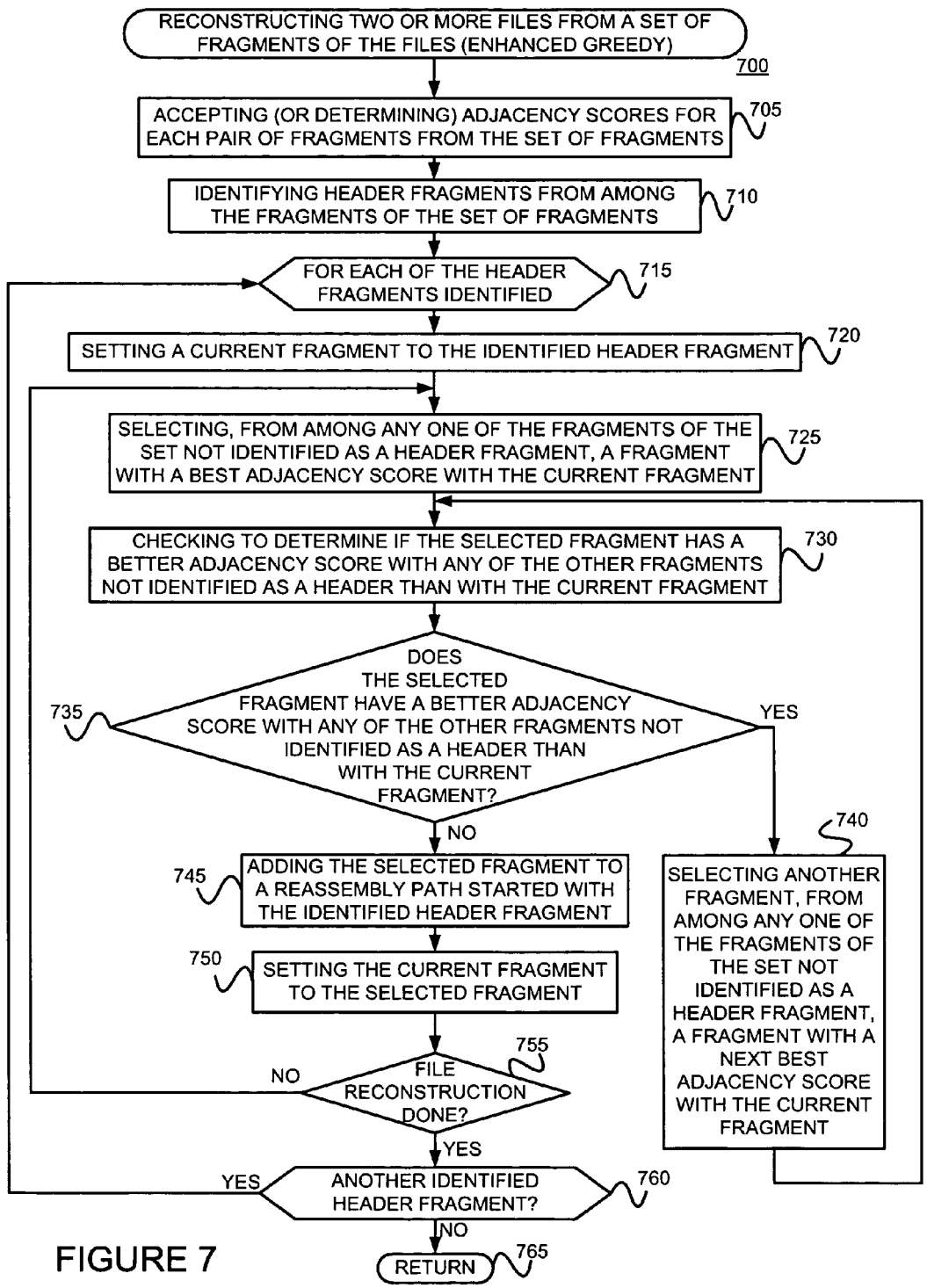
FIG. 7 is a flow diagram of an exemplary method for reconstructing two or more files from a set of fragments of the files using an enhanced greedy approach in a manner consistent with the present invention.

The method 500 may be used to create unique path reconstructions (each fragment can only belong to one file) without having the reconstructions depend on the order of the files being reconstructed. The method 500 can do so by reassembling files simultaneously. Starting with the file headers, the best match for each header is chosen, and the header-fragment pair with the best of all the best matches is picked (that fragment is assigned to the header). This is repeated until all files are reconstructed. More formally, the k file headers might be stored as the starting fragments in the reconstruction paths $P_i$ for each of the k files. A set $S=(s_1, s_2, \ldots, s_k)$ of current fragments might be maintained for processing, where $s_i$ is the current fragment for the $i^{th}$ file. Initially, all the k starting header fragments might be stored as the current fragments for each file ($s_i=h_i$). Then, the best greedy match for each of the k starting fragments might be found. These matches might be stored in the set $T=(t_1, t_2, \ldots, t_k)$ where $t_i$ represents the best adjacency score for $s_i$. From the set T of best matches, the fragment with the overall best adjacency score is chosen. Assume that this fragment was $t_i$. Then, this fragment might be added to the reconstruction path of the $i^{th}$ file ($P_i=P_i\|t_i$). The current fragment for the $i^{th}$ file is replaced ($s_i=t_i$) and the new set T of best adjacency scores is evaluated for S. The best score among the fragments in T is chosen, added to its path, and the process is repeated until all files have been reconstructed. FIG. 7 of the '370 provisional shows an example of the algorithm where there are three images being reconstructed. FIG. 7(a) shows the headers $h_1$, $h_2$ and $h_3$ of the three images and their best matches. The best of all the matches is presented with a dotted line and is the $h_{2-6}$ pair of fragments. FIG. 7(b) of the '370 provisional shows the new set of best matches after fragment 6 has been added to the reconstruction path of $h_2$. Now fragment 4 is chosen once each for fragments $h_1$ and 6. However, the pair $h_1$-4 is the best, and therefore 4 is added to the reconstruction path of $h_1$ and the next best match for fragment 6 is determined 7(c). This process continues until all images are reconstructed.

One potential problem with this approach is that the best fragments being matched with the current S set of fragments may be better matches for fragments that have not been processed as yet. This can lead to error propagation. The enhanced greedy version of this method attempts to reduce the probability of this occurring.

§4.2.3 Lowest Cost Unique Path Reconstruction of Files

Figure 6:
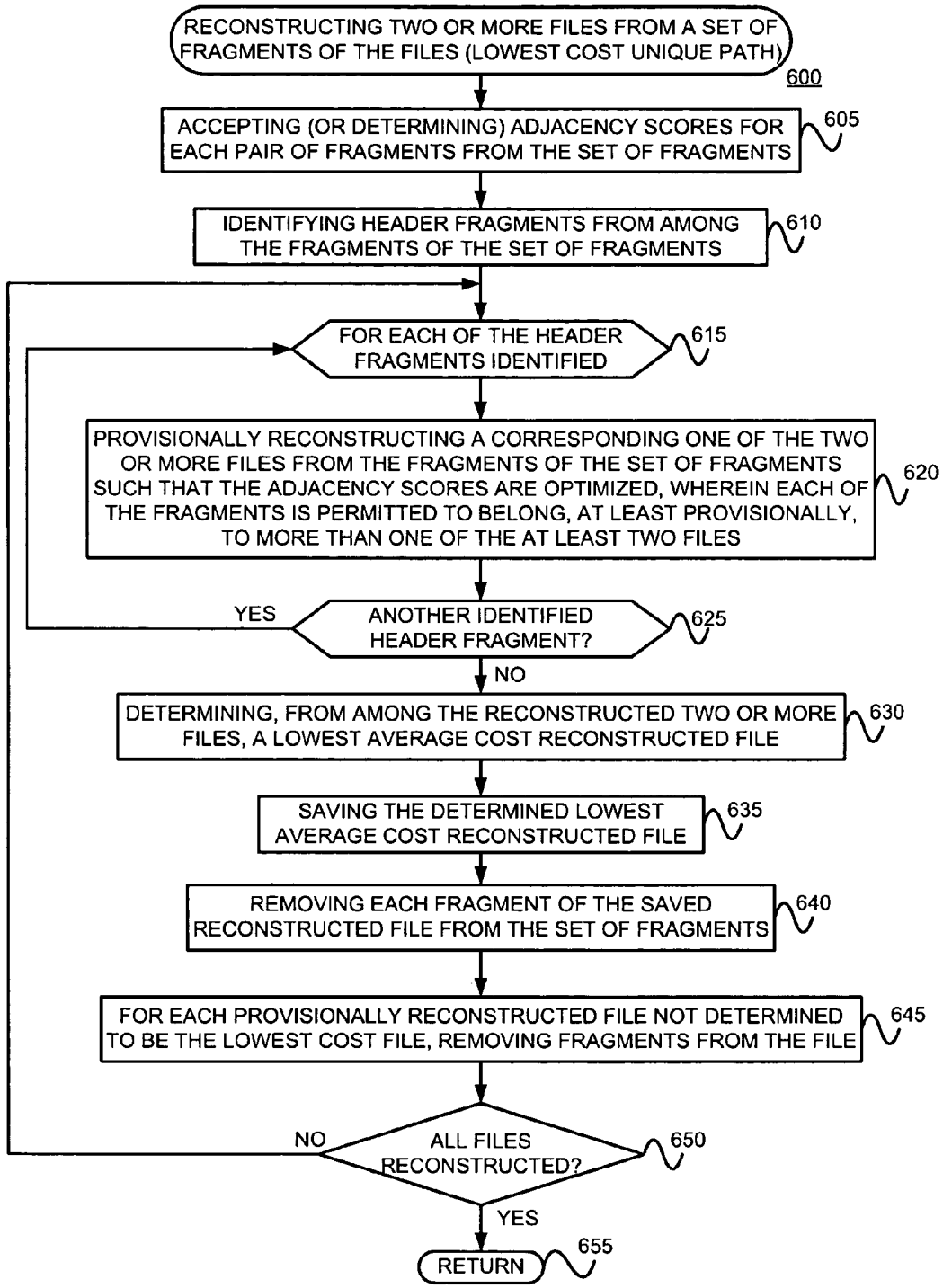
FIG. 6 is a flow diagram of an exemplary method for reconstructing two or more files from a set of fragments of the files using a lowest-cost unique path approach in a manner consistent with the present invention.

FIG. 6 is a flow diagram of an exemplary method 600 for reconstructing two or more files from a set of fragments of the files using a lowest-cost unique path approach in a manner consistent with the present invention. As shown, adjacency scores for each pair of fragments from the set of fragments is accepted or determined. (Block 605) Header fragments are identified from among the fragments of the set of fragments. (Block 620) As indicated by loop 615-625, block 620 is performed for each of the header fragments identified. In particular, one of the two or more files corresponding to the current header fragment is provisionally reconstructed from the fragments of the set of fragments such that the adjacency scores are optimized, wherein each of the fragments is permitted to belong, at least provisionally, to more than one of the at least two files. Once each of the identified header fragments has a provisionally reconstructed file, a lowest average cost reconstructed file is determined from among the reconstructed two or more files. (Block 630) The determined lowest average cost reconstructed file is then saved. (Block 635) Each fragment of the saved reconstructed file is removed from the set of fragments. (Block 640) Fragments are removed from the files for each provisionally reconstructed file not determined to be the lowest cost file. (Block 645) The process is then repeated for the remaining files (Decision Block 650) until all files have been reconstructed, at which point the method 600 may be left (Node 655).

Referring back to block 630, if the adjacency scores are cost weights, then the average cost of a reconstructed file might be the sum of the cost weights of the fragments of the reconstructed file divided by the number of fragments in the reconstructed file.

As discussed above, a great advantage of the non-unique path methods is that error propagation due to assigning a fragment to a file it did not belong to does not occur. Unfortunately, however, the disadvantage is that if a single fragment is used more than once in the reconstruction of files, an error will have occurred. The method 600 attempts to get the benefits of the non-unique path methods, while ensuring a unique path is obtained (a single fragment will not occur in more than one reconstructed file). It does so by running a non-unique path determination across all the files, and computing the total cost for each file. It is assumed that the best reconstructed file is the one with the lowest average path cost. The total cost might simply be the sum of the weights between the fragments of the reconstructed file. Since files may use different number of fragments, the total cost of a file might be divided by the number of fragments in the file to get the average cost of each path. The reconstructed file with the reconstruction path having the lowest average cost might be selected and marked as reassembled. Its fragments might then be removed from the set of available fragments to ensure that these fragments are not again used in the reconstruction of another file. This process is repeated until all files have been reconstructed. Referring back to block 620, the act of reconstructing a corresponding one of the two or more files might use an enhanced greedy methodology (described below) instead.

§4.2.4 Enhanced Greedy Reconstruction of Files

One problem with the greedy heuristic introduced in §1.2 above is that it chooses the best available matching fragment t for the current fragment s ignoring the possibility that fragment t may be an even better match for another fragment that has not been processed as yet. This can be avoided by adding a check before a fragment is added to a path. So-called "enhanced greedy" embodiments consistent with the present invention attempt to address this problem. The enhanced greedy embodiments attempt to determine if the best match for a fragment may be an even better match for another fragment. If this is the case then the next best match is chosen, and the process repeated until a fragment is found that is not a better match for any other fragment.

Like the greedy heuristic, the enhanced greedy embodiments initially choose the best available fragment t for the current fragment s being processed. The fragment t's best predecessor fragment b is then checked. Here b is the fragment that has the best adjacency score when being compared to t. (However, t may not necessarily be the best match for b.) If b=s, the current fragment matches better than all other fragments with t, in which case the fragment t is selected in the reconstruction path. If b≠s then b's best match is checked. If this is equal to t (t was a better match for b and b's best match was t), then the next best child match for s is determined and evaluated as before.

Exemplary pseudo code for the enhanced greedy method is:

```
function enhancedGreedy(currentFragment, availableFragments[ ]) {
    for(x= 1;x < number of availableFragments[ ]; ++x)
    {
        set bestMatch = get best < x > fragment for currentFragment
        if (bestMatch found in availableFragments[ ])
        {
            set bestPredecessor = get best predecessor match for
            bestMatch
            if (bestPredecessor = currentFragment)
                set bestFinalMatch = bestMatch
            else
            {
                set bestPredecessorBestMatch = get best match for
                bestPredecessor if (bestPredecessorBestMatch =
                bestMatch)
                    Repeat loop for next best match
                else
                {
                    if (currentFragment is > 3rd best fragment for
                    bestMatch)
                        Repeat loop for next best match
                    else
                        set bestFinalMatch = bestMatch
                }
            }
            return bestFinalMatch
        }
    }
}
```

FIG. 7 is a flow diagram of an exemplary method 700 for reconstructing two or more files from a set of fragments of the files using an enhanced greedy approach in a manner consistent with the present invention. As shown, adjacency scores for each pair of fragments from the set of fragments is accepted or determined. (Block 705) Header fragments are identified from among the fragments of the set of fragments. (Block 720) As indicated by loop 715-760, various acts are performed for each of the header fragments identified. In particular a current fragment is set to the identified header fragment (Block 720), a fragment with a best adjacency score with the current fragment is selected, from among any one of the fragments of the set not identified as a header fragment (Block 725), and it is determined whether or not the selected fragment has a better adjacency score with any of the other fragments not identified as a header than with the current fragment (Decision Block 735). If it is determined that the selected fragment has a better adjacency score with any of the other fragments not identified as a header than with the current fragment, then another fragment, from among any one of the fragments of the set not identified as a header fragment, with a next best adjacency score with the current fragment is selected (Block 740) before the method 700 branches back to block 730. Referring back to decision block 735, if it is determined that the selected fragment does not have a better adjacency score with any of the other fragments not identified as a header than with the current fragment, then (1) the selected fragment is added to a reassembly path started with the identified header fragment (Block 745), (2) the current fragment is set to the selected fragment (Block 750), and (3)

it is determined whether or not the file reconstruction is done (Decision block 755). If not, the method 700 branches back to block 725. If, on the other hand, the file reconstruction is done, a next identified header fragment in the loop 715-760 is processed until all of the identified fragments have been processed, at which time, the method 700 is left. (Node 765)

In at least some embodiments of the method 700, each of the fragments is permitted to belong to only one of the at least two files.

Some embodiments consistent with the present invention might reconstruct two or more files from a set of fragments of the files using an enhanced greedy, lowest cost path first, technique. FIG. 8, which includes FIGS. 8A and 8B, is a flow diagram of an exemplary method 800 for reconstructing two or more files from a set of fragments of the files using an enhanced greedy, lowest cost path first, technique. Referring to both FIGS. 7 and 8A, blocks 805-860 of the method 800 are similar to blocks 705-760 of FIG. 7 except that, in block 845, the selected fragments is provisionally added to the reassembly path started with the identified header fragment. Further, once all of the identified fragments have been processed, instead of completing, the method 800 continues (via Node B 865), to FIG. 8B, at this point, the method 800 is similar to blocks 630-650 of FIG. 6. Specifically, once each of the identified header fragments has a provisionally reconstructed file, a lowest average cost reconstructed file is determined from among the reconstructed two or more files. (Block 870) The determined lowest average cost reconstructed file is then saved. (Block 875) Each fragment of the saved reconstructed file is removed from the set of fragments. (Block 880) Fragments are removed from the files for each provisionally reconstructed file not determined to be the lowest cost file. (Block 885) The process is then repeated for the remaining files (Decision Block 890 and Node A 895) until all files have been reconstructed, at which point the method 800 may be left (Node 899).

Referring back to block 870, if the adjacency scores are cost weights, then the average cost of a reconstructed file might be the sum of the cost weights of the fragments of the reconstructed file divided by the number of fragments in the reconstructed file.

As can be appreciated, the various methods of described in §§4.2.1-4.2.4 can be classified by their ability to create vertex disjoint paths (unique paths) or not (non-unique paths), whether or not files are reconstructed serially (one file at a time) or in parallel, and according to the whether or not a greedy or enhanced greedy heuristic is used.

One problem with unique path methods is that a fragment assigned incorrectly to file A, but belonging to file B will always result in A and B reconstructing incorrectly. The non-unique path (NUP) methods, where a fragment may be used more than once for file reconstruction, avoid this potential error propagation problem, but do not necessarily lead to vertex disjoint paths.

§4.3 Refinements, Alternatives and Extensions

§4.3.1 Assigning Adjacency Weights

Referring back to blocks 130, 410, 510, 605, 705 and 805 of FIGS. 1, 4, 5, 6, 7 and 8, respectively, recall that adjacency scores might be accepted or determined. This section describes three (3) different ways to evaluate the candidate weights between any two fragments of image files—(1) Pixel Matching (PM), (2) Sum of Differences (SoD) and (3) Median Edge Detector (MED)—that might be used in some embodiments consistent with the present invention. In the context of an image file, when comparing any two fragments i and j, the candidate weight for C(i,j) involves comparing the last w (image width) pixels of fragment i with the starting w pixels of fragment j. Since different pixels values are being compared, more often than not, the weights for C(i,j) will be different than those for C(j,i).

Assigning adjacency scores (e.g., weights) becomes slightly more complicated when images with different widths are fragmented, as multiple weights should be calculated between any two fragments. This is because the number of pixels used in the calculation will be different for each width and as a result the weights computed may differ.

Since it is initially unknown which image a fragment belongs to, adjacency scores (e.g., weights) between fragments i and j for every unique width encountered in the k image header fragments are determined. The candidate weights for a pair of fragments might be assigned by examining pixel gradients that straddle the boundary formed when the two fragments are joined together. It is known that an image consists mostly of smooth regions and the edges present have a structure that can often be captured by simple linear predictive techniques. Hence one way to assess the likelihood that two image fragments are indeed adjacent in the original image is to compute prediction errors based on some simple linear predictive techniques like one of this used in lossless JPEG or even better, the MED predictor used in JPEG-LS (See, e.g., N. Memon and R. Ansari, *The JPEG Lossless Compression Standards. Handbook of Image and Video Processing*, A. Bovik, Editor, (Academic Press, 2000); incorporated herein by reference.), and then computing the absolute sum of prediction errors for the pixels along the boundary formed between the two fragments (See FIG. 4 of the '370 provisional). That is, prediction errors might be computed for pixels in the last row of the first fragment and the pixels in the first row of the second fragment.

The results of three (3) aforementioned techniques were evaluated to determine the prediction errors between two fragments. The evaluation of each is discussed below.

Pixel Matching (PM) is the simplest technique whereby the total number of pixels matching along the edges of size w for the two fragments are summed. In FIG. 4 of the '370 provisional, the width (w) is five (5) and PM would compare to see if each numbered pixel in fragment i matched in value with the same numbered pixel in fragment j. If the pixels matched the value of the PM weight would be incremented by one. For PM, the higher the weight, the better the assumed match.

Sum Of Differences (SoD) is calculated across the RGB pixel values of the edge of every fragment with every other fragment. In FIG. 4 of the '370 provisional, SoD would sum the absolute value of the difference between each numbered pixel in fragment i with the same numbered pixel in fragment j. For SoD, the lower the weight, the better the assumed match.

With Median Edge Detection (MED), each pixel is predicted from the value of the pixel above, to the left and left diagonal to it. In FIG. 4 of the '370 provisional, MED would sum the absolute value of the difference between the predicted value in fragment j and the actual value. For MED, the lower the weight, the better the assumed match.

The foregoing schemes are useful to fragments of an image file. However, fragments of other types of files might need to be reassembled. Prediction by Partial Matching (PPM) is used for files other than images. Each fragment of the document is individually processed by PPM and the resulting statistics are combined to form a single model. Suppose an i-order PPM model is used. Then a sliding window of size i or less can be used and the upcoming symbol can be predicted with some probability. Prediction probabilities of each model are then combined into a single probability using PPMC method as described in the article, A. Moffat, "Implementing the ppm data compression scheme," *IEEE Transactions on Communications* (1990). The resulting probability is the candidate probability of adjacency for a pair of fragments.

The present inventors believe that SoD and MED are far more useful than PM for images. For example, when dealing with image fragments, adjacency scores (e.g., weights) can be computed based on gradient analysis across the boundaries of each pair of fragments. PPM is believed to work fairly well on other file types.

Note that adjacency scores can be derived from any of the adjacency weights output by the foregoing techniques.

Although the file reconstruction techniques may use adjacency scores based on the adjacency weights provided by any of the foregoing techniques, other ways for determining adjacency scores may be used with embodiments consistent with the present invention. Indeed, some embodiments consistent with the present invention might simply accept previously determined adjacency scores.

In addition to identifying file types, information obtained from the header can be used to determine other characteristics of the file which might be used to simplify the reconstruction problem. For example, in the case of BMPs, the resolution of an image and the size of the image can be determined from header information. From the resolution, the width of the image can be determined, and as a result, the number of pixels to use for fragment candidate adjacency score calculations can be determined. From each image's size, the total number of fragments required to build the original image can be determined. Thus, in case of images, the header also provides information on the resolution which might be used to compare fragments and evaluate candidate adjacency scores.

§4.3.2 Greedy or Enhanced Greedy

Referring back to blocks 440, 540 and 620 of FIGS. 4, 5 and 6, respectively, these methods might use a greedy heuristic or an enhanced greedy heuristic. As discussed above, the enhanced greed heuristic adds a check before a fragment is added to a path in order to determine if the best match for a fragment may be an even better match for another fragment. If this is the case then the next best match is chosen, and the process repeated until a fragment is found that is not a better match for any other fragment. Examples of exemplary methods using enhanced greedy method are described.

In either case, adjacency scores can be accepted or precomputed. In other case, the adjacency scores might be advantageously sorted before the paths are reconstructed. The enhanced greedy method might also sort the best predecessor fragment matches for each fragment.

§4.3.2.1 Enhanced Greedy Unique Path

Enhanced greedy unique path embodiments consistent with the present invention might operate as follows. Let $P_i$ be the reconstruction path of file i and the header fragment for i be $h_i$. To begin with, the header $h_i$ is chosen as the first fragment in the reconstruction path (assign $P_i=h_i$). The current fragment is set equal to the header, $s=h_i$. The best available enhanced greedy match t for s is then found. The best available match is s's best match t that has not been used in any another file reassembly. The fragment t is added to the reconstruction path ($P_i=P_i\|t$) and it is set as the current fragment for processing (s=t). This is repeated until the file is reconstructed. The remaining files are similarly processed until all k files have been reassembled.

§4.3.2.2 Enhanced Greedy Non-Unique Path

Enhanced greedy non-unique path embodiments might operate as follows. Any file header can be chosen to start with. This header $h_i$ is chosen as the first fragment in the reconstruction path (assign $P_i=h_i$). The current fragment is set equal to the header, $s=h_i$. The best enhanced greedy match t for s is then found. Even if the best match was used in another reassembly, it is nonetheless selected, added to the reconstruction path ($Pi=P_i\|t$), and set as the current fragment for processing (s=t). This is repeated until the file is reconstructed. The remaining files are similarly processed until all k files have been reassembled.

§4.3.2.3 Enhanced Greedy Parallel Unique Path

Enhanced greedy parallel unique path embodiments might operate as follows. Starting with the file headers, we choose the best match for each header is chosen. The header fragment pair with the best of all the best matches is picked, and that fragment is assigned to the header (added to the path started by that header). This is repeated until all files are reconstructed. For example, the k file headers might be stored as the starting fragments in the reconstruction paths $P_i$ for each of the k files. A set $S=(s_1, s_2, \ldots s_k)$ of current fragments might be maintained for processing, where $s_i$ is the current fragment for the $i^{th}$ file. Initially all the k starting header fragments are stored as the current fragments for each file ($s_i=h_i$). The best greedy match for each of the k starting fragments is found and stored in the set $T=(t_1, t_2, \ldots, t_k)$ where $t_i$ represents the best match for $s_i$. From the set T of best matches, the fragment with the overall best weight is chosen. Assume that this fragment was $t_i$. The fragment is added to the reconstruction path of the $i^{th}$ file (Pi=Pi∥ti), the current fragment for the $i^{th}$ file is replaced ($s_i=t_i$). A new set T of best matches for S is then determined and similarly evaluated. This is repeated until all files have been reconstructed.

§4.3.2.4 Enhanced Greedy Lowest Cost Unique Path

Enhanced greedy lowest cost unique path embodiments might operate as follows. Here the assumption made is that the best reconstructed file is the one with the lowest average path cost. Enhanced greedy non-unique path may be run across all the files and the total cost for each file may be computed. The total cost is the simply the sum of the weights between the fragments of the reconstructed file. Since files may use different number of fragments, the total cost of a file might be divided by the number of fragments in the file to get the average cost of each path. The file with the reconstruction path having the lowest average cost is selected and marked as reassembled. Its fragments are removed from the set of available fragments. The process is repeated on the remaining files and fragments until all files have been reconstructed.

§4.3.3 Using User Feedback

It should be noted that the solution found by any exemplary method consistent with the present invention might not result in reconstruction of the original files. However, if candidate adjacency scores have been properly assigned, then the optimal solution should have a large number of fragments in the right place, or almost in the right place. Thus, referring back to FIG. 1, user interface operations/module 180 might be used a small number of most likely reconstructions can be presented to a user. The user might then select the correct reordering.

§4.4 Exemplary Implementations

Embodiments consistent with the present invention may be implemented in hardware (e.g., ICs, ASICs, FPGAs, general purpose processors, etc.) and/or software (e.g., stored program instructions executed by a microprocessor, such as on a personal computer). The operations described above may be performed on one or more computers. Such computers may communicate with each other via one or more networks, such as the Internet for example.

FIG. 9 is a block diagram of apparatus 900 that may be used to perform at least some operations, and store at least some information, in a manner consistent with the present invention. The apparatus 900 basically includes one or more processors 910, one or more input/output interface units 930, one or more storage devices 920, and one or more system buses and/or networks 940 for facilitating the communication of information among the coupled elements. One or more input devices 932 and one or more output devices 934 may be coupled with the one or more input/output interfaces 930.

The one or more processors 910 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to perform one or more aspects of the present invention. At least a portion of the machine executable instructions may be stored (temporarily or more permanently) on the one or more storage devices 920 and/or may be received from an external source via one or more input interface units 930.

In one embodiment, the machine 900 may be one or more conventional personal computers. In this case, the processing units 910 may be one or more microprocessors. The bus 940 may include a system bus. The storage devices 920 may include system memory, such as read only memory (ROM) and/or random access memory (RAM). The storage devices 920 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 932, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 910 through an appropriate interface 930 coupled to the system bus 940. The output devices 934 may include a monitor or other type of display device, which may also be connected to the system bus 940 via an appropriate interface. In addition to (or instead of) the monitor, the personal computer may include other (peripheral) output devices (not shown), such as speakers and printers for example.

Referring back to FIG. 1, the various operations/modules may be performed by one or more machines 900. Alternatively, or in addition, various modules may be implemented in hardware. Thus, embodiments consistent with the present invention may be implemented in hardware (e.g., ICs, ASICs, FPGAs, general purpose processors, etc.) and/or software (e.g., stored program instructions executed by a microprocessor, such as on a personal computer).

§4.5 Conclusions

As can be appreciated from the foregoing, embodiments consistent with the present invention provide useful ways to reconstruct fragmented files. This is useful in digital forensics to recover evidence and in disaster recovery to recover lost data. These techniques can automatically reassemble the fragments using the adjacency scores, but can also efficiently incorporate human intelligence into the reassembly process (since the techniques are probabilistic, at worst they can be used to reduce the problem space of reassembling large number of fragments by providing users with most probable matches). These techniques can be applied regardless of file formats, number of files, or type of file system.

What is claimed is:

1. A computer-implemented method for reconstructing two or more files from a set of fragments of the files, the method comprising:
    a) accepting, by using a computer, adjacency scores for each pair of fragments from the set of fragments;
    b) identifying header fragments from among the fragments of the set of fragments;
    c) for each header fragment of the header fragments identified in act (b),
        i) setting a current fragment to the identified header fragment,
        ii) selecting, from among any one of the fragments of the set not identified as a header fragment, a fragment with a highest adjacency score with the current fragment,
        iii) checking to determine if the selected fragment of a file started with the identified header fragment has a better adjacency score with any of other fragments not identified as a header fragment than with the current fragment of the file started with the identified header fragment,
        iv) if the selected fragment of the file started with the identified header fragment has a better adjacency score with any of the other fragments not identified as a header than with the current fragment of the file started with the identified header fragment, then
            (A) selecting another fragment, from among any one of the fragments of the set not identified as a header fragment, a fragment with a next highest adjacency score with the current fragment of the file started with the identified header fragment, and
            (B) repeating act (iii) and (iv), and
        if the selected fragment of the file started with the identified header fragment does not have a better adjacency score with any of the other fragments not identified as a header than with the current fragment of the file started with the identified header fragment, then
            (C) provisionally adding the selected fragment of the file started with the identified header fragment to a reassembly path started with the identified header fragment, and
            D) setting the current fragment of the file started with the identified header fragment to the selected fragment of the file started with the identified header fragment;
    d) determining, from among the reconstructed two or more files, a lowest average cost reconstructed file;
    e) saving the determined lowest average cost reconstructed file;
    f) removing each fragment of the saved reconstructed file from the set of fragments;
    g) for each reconstructed file not determined to be lowest cost file, removing provisionally added fragments from a reassembly path of the file; and
    h) repeating acts (c)-(g) for remaining files until all files have been reconstructed.

2. The computer-implemented method of claim 1 wherein the adjacency scores are cost weights, and
    wherein the average cost of a reconstructed file is the sum of the cost weights of the fragments of the reconstructed file divided by the number of fragments in the reconstructed file.

3. The computer-implemented method of claim 1 wherein the files include images.

4. The computer-implemented method of claim 1 further comprising: determining accepted adjacency scores for each pair of fragments from the set of fragments.

5. The computer-implemented method of claim 1 wherein the act of reconstructing a corresponding one of the two or more files from the fragments of the set of fragments is done automatically, without human intervention.

6. The computer-implemented method of claim 1 wherein the act of reconstructing a corresponding one of the two or more files from the fragments of the set of fragments is done semi-automatically, wherein human feedback is used to accept or reject partial or complete file reconstructions.

7. Apparatus for reconstructing two or more files from a set of fragments of the files, the apparatus comprising:
at least one computer; and
a storage device storing program instructions which, when executed by the at least one computer, perform a method including
a) accepting adjacency scores for each pair of fragments from the set of fragments;
b) identifying header fragments from among the fragments of the set of fragments;
c) for each header fragment of the header fragments identified in the step (b),
  i) setting a current fragment to the identified header fragment,
  ii) selecting, from among any one of the fragments of the set not identified as a header fragment, a fragment with a highest adjacency score with the current fragment,
  iii) checking to determine if the selected fragment of a file started with the identified header fragment has a better adjacency score with any of other fragments not identified as a header fragment than with the current fragment of the file started with the identified header fragment,
  iv) if the selected fragment of the file started with the identified header fragment has a better adjacency score with any of the other fragments not identified as a header than with the current fragment of the file started with the identified header fragment, then
    (A) selecting another fragment, from among any one of the fragments of the set not identified as a header fragment, a fragment with a next highest adjacency score with the current fragment of the file started with the identified header fragment, and
    (B) repeating acts (iii) and (iv), and
  if the selected fragment of the file started with the identified header fragment does not have a better adjacency score with any of the other fragments not identified as a header than with the current fragment of the file started with the identified header fragment, then
    (C) provisionally adding the selected fragment of the file started with the identified header fragment to a reassembly path started with the identified header fragment, and
    D) setting the current fragment of the file started with the identified header fragment to the selected fragment of the file started with the identified header fragment;
d) determining, from among the reconstructed two or more files, a lowest average cost reconstructed;
e) saving the determined lowest average cost reconstructed file;
f) removing each fragment of the saved reconstructed file from the set of fragments;
g) for each reconstructed file not determined to be the lowest cost file, removing provisionally added fragments from a reassembly path of the file; and
h) repeating acts (c)-(g) for remaining files until all files have been reconstructed.

8. The apparatus of claim 7 wherein the adjacency scores are cost weights, and
wherein the average cost of a reconstructed file is the sum of the cost weights of the fragments of the reconstructed file divided by the number of fragments in the reconstructed file.

9. The apparatus of claim 7 wherein the files include images.

10. The apparatus of claim 7 wherein the method further includes determining accepted adjacency scores for each pair of fragments from the set of fragments.

11. The apparatus of claim 7 wherein the act of reconstructing a corresponding one of the two or more files from the fragments of the set of fragments is done automatically, without human intervention.

12. The apparatus of claim 7 wherein the act of reconstructing a corresponding one of the two or more files from the fragments of the set of fragments is done semi-automatically, wherein human feedback is used to accept or reject partial or complete file reconstructions.

* * * * *